Aug. 1, 1967 D. B. BICKLER ETAL 3,334,217

SIMULATION OF SOLAR RADIATON

Filed April 12, 1962

2 Sheets-Sheet 1

INVENTORS
DONALD B. BICKLER
HANS S. RAUSCHENBACH

BY M. Jabin

ATTORNEY

INVENTORS
DONALD B. BICKLER
HANS S. RAUSCHENBACH

BY M. Jabin

ATTORNEY

United States Patent Office 3,334,217
Patented Aug. 1, 1967

3,334,217
SIMULATION OF SOLAR RADIATION

Donald B. Bickler, Arcadia, and Hans S. Rauschenbach, Pasadena, Calif., assignors to Hoffman Electronics Corporation, a corporation of California Filed Apr. 12, 1962, Ser. No. 186,950
1 Claim. (Cl. 240—1.1)

The present invention relates to devices for simulating the radiation of the sun, and improved solar cells made possible thereby.

With the advent of space programs, the solar cell has become of key scientific importance, because it is the logical source of power for satellites—simple and uncomplicated with no moving parts, relatively invulnerable to shock and extreme climatic conditions, and capable of supplying sufficient power to replenish batteries for "shadow-time" operation of the various instruments, radios, and other scientific "reporters" on a space vehicle.

Present-day space applications of solar cells require that accurately calibrated, precision equipment be used for testing and measuring the efficiency of solar cells. Sunlight reaching the surface of the earth cannot be used in these tests, because it is different from the sunlight out in space, which can be defined as the region where sunlight is not altered by the earth's atmosphere.

As sunlight travels through space on its way to earth, it has a certain distribution of colors. Each separate color, or wavelength, has its own intensity. A researcher named F. S. Johnson collected information on this wavelength-compared-to-energy situation in space, and constructed a graphical analysis commonly called "Johnson's curve." It shows a peak energy level at a wavelength a little under 0.5 micron, with a gradual decline in energy as the wavelength gets longer.

As the sun penetrates through clouds, water vapor, air, and air contaminants on its way to the earth's surface, a lot of the shorter, blue wavelengths are filtered out, leaving light which is a lot more red-colored than it is in free space. This shift to the redder colors can be seen in late afternoon, when the rays must travel through much more air before they reach an earthbound observer.

The differences between sunlight in space and sunlight reaching the earth's surface make it necessary to use artificial light sources to simulate solar radiation in space. Ever since solar cells were developed, their makers have tested their efficiency and graded them by means of a standard test using a tungsten lamp, a scientific relative of the household light bulb. The tungsten lamp is a light source that has the bulk of its energy in the red portion of the spectrum, and has been satisfactory for earthbound applications of the solar cell, such as its use as a readout for punched tape or cards. Since the tungsten test, however, rates highly those cells sensitive to the red portion of the spectrum, it is an unsatisfactory test for space applications.

The most critical single unit affecting the testing of space solar cells is the light source. Changes in the blue portion of the spectral response of a solar cell are more significant in space than changes in the red portion. This is because the peak intensity of the radiation of the sun is at approximately .46 micron, while the peak response of the cell is at .83 micron. In order to properly evaluate solar cells for space applications, it is necessary to test cells under a light with spectral characteristics similar to those of the sun in space.

At present, as has been mentioned, most testing is done under tungsten incandescent lights. These lamps have a color temperature of less than 3400° K. and, as a result, have far too much radiation in the infrared region. Even when used with 3 cm. of water as an infrared absorbing filter, there is insufficient radiataion in the blue portion of the spectrum for testing solar cells.

Carbon arcs are sometimes used for testing solar cells. The spectral distribution of a carbon arc more closely approximates the sun than the spectral distribution of tungsten. The situation is reversed in this case, however, since the carbon arc emits too much blue radiation. If the arc's energy at approximately .5 micron is set equal to that of the sun, the energy at .83 micron, where the response of the solar cells is greatest, is only 65% as great as the sun. An even greater problem pertaining to the carbon arc is its lack of stability.

Xenon arcs have a very nearly uniform intensity throughout the visible portion of the spectrum. However, at .83 micron and at .88 micron there appear very large spikes of energy which greatly affect solar cell measurements.

Mercury arcs normally have narrow bands of energy emission which render them useless for solar cell measurements. When the operating pressure is over 300 atmospheres, the spectral distribution begins to approach that of the sun, but arc lamps which operate at such pressures are not commercially available.

It is an object of the present invention, therefore, to provide a novel solar radiation simulator.

It is another object of the present invention to provide a device able to simulate the intensity and spectral distribution of solar radiation in space, in order to make accurate measurements of the efficiency of solar cells feasible on the surface of the earth.

It is still another object of the present invention to provide solar cells having a high efficiency in space.

According to the preferred embodiment of the present invention, a solar radiation simulator comprises two light sources for simulating the sunlight of space, one source for the blue portion and another source for the remaining red portion of the spectrum. The blue portion is the contribution of a xenon arc lamp with an absorption filter which attenuates the large energy spikes in the infrared region of the spectrum. The red portion of the spectrum is supplied by a tungsten lamp with suitable filters to blend it with the blue portion of the spectrum and to reduce the infrared region.

The two sources are placed side by side and are directed to illuminate the test area at a particular distance from the sources. Associated equipment includes various sensitive measuring devices, power sources, and cooling and vacuum systems needed to provide the proper conditions for the simulator and the cells being tested. The simulator very closely approximates the intensity and spectral distribution of solar radiation in space, with sufficient stability to accurately measure the power conversion of solar cells. This simulator has made it possible to produce high efficiency solar cells having a thinner diffused surface and a shallower junction. The increased efficiency makes it possible to design solar-cell panels that are smaller, lighter, less expensive, and more reliable. In addition to being more efficient, such solar cells have a longer useful life in space, because shallower junctions have greater nuclear radiation resistance.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which:

Figure 1:
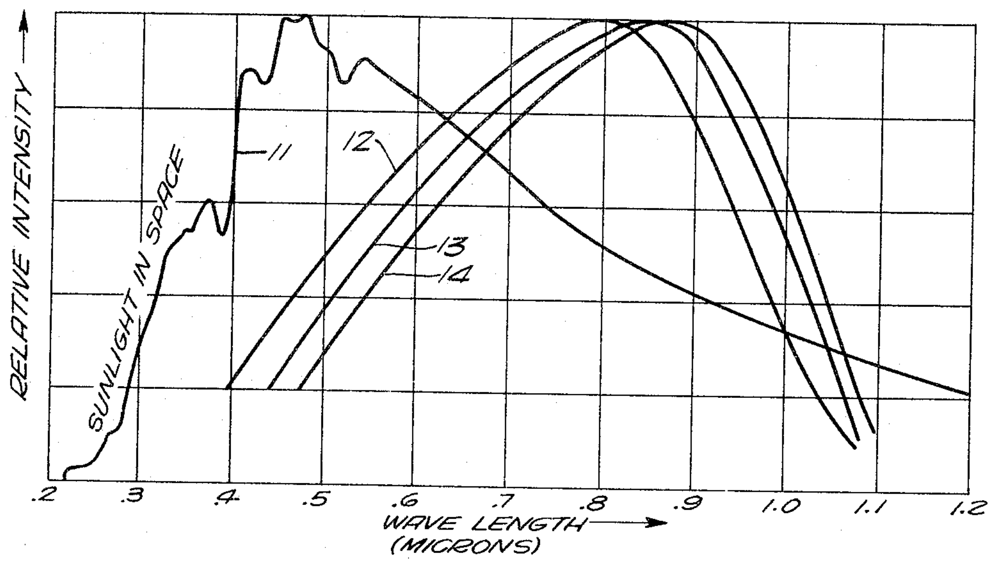
FIGURE 1 is a graph of the spectral distribution of sunlight in space compared to the response of conventional solar cells.

Turning now to the drawings, FIGURE 1 shows curve 11, representing the spectral distribution of sunlight in space, according to F. S. Johnson. Curves 12, 13 and 14 show the spectral responses of typical conventional solar cells that have been manufactured under conditions tested with tungsten light at 2800° K. The cells respond most strongly at a particular wavelength, with the response falling off on both sides of the peak color. It is apparent from FIGURE 1 that the use of a tungsten light source has resulted in the production of solar cells that are more sensitive to the red, or longer wavelength, portion of the spectrum, and the response of such cells does not peak at the proper wavelength to be most efficient in space.

Figure 2:
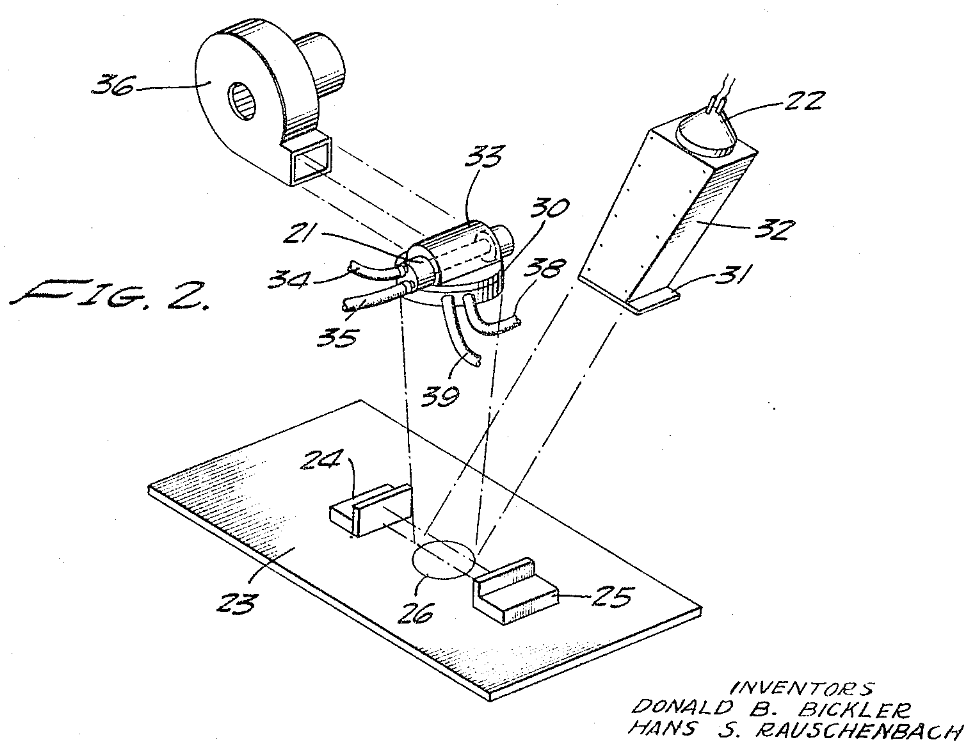
FIGURE 2 shows a solar radiation simulator according to the present invention.

FIGURE 2 shows the major components of the simulator according to the present invention simulating sunlight in space. The heart of the instrument is a metal cabinet (not shown) containing two light sources. One light source is xenon arc lamp 21, which produces light with a heavy blue content. The other light source is tungsten lamp 22, which emits light largely in the red portion of the spectrum. The beams from the two light sources are modified by a series of filters, blended, and focused on test platform 23, upon which cells can be mounted for measurement and testing. Pyrheliometer sensors 24 and 25 measure the intensity of the light falling upon uniform-intensity test area 26, which can be 1 cm. by 2 cm. in size to accommodate the same-sized solar cell under test.

Light from xenon arc lamp 21 can be filtered in filter 30 by a copper-sulfate-in-water medium containing the cupric ion ($Cu^{++}$) of proper concentration to limit the radiation between .675 and .700 micron to a value of approximately 13% of the radiation between .500 and .525 micron. Instead of the copper-salt solution, a glass filter containing copper ions ($Cu^{++}$), such as Corning glass #9788 which is approximately .075 inch thick, could be used in combination with a water filter. This filter very satisfactorily absorbs the red end of the spectrum and transmits the remainder.

The light from xenon lamp 21 is then mixed with light from the tungsten filament, which is filtered by filter 31 at one end of tungsten unit housing 32, to absorb energy at the proper wavelengths, so that the combination closely approximates the radiation in space as reported by Johnson. Filter 31 is a composite of three colored-glass filters. The glass filters used are:

(a) Green Corning glass #4600 ground to a thickness of approximately .025 inch, so that it has a light transmission at 1.1 microns of approximately 36% of its transmission at .75 micron;

(b) Brown Corning glass #2404 ground to a thickness of approximately .006 inch, so that it has a light transmission at .6 micron of approximately 63% of its transmission at 1.1 microns; and (c) Red Corning glass #2424 ground to a thickness of approximately .020 inch, so that it has a transmission at .53 micron of approximately 50% of its transmission at .7 micron, and it has a transmission at .56 micron of approximately 10% of its transmission at .7 micron.

Xenon arc lamp 21 is provided with elliptical reflector 33 and a water cooling system circulated through inlet port 34 and outlet port 35. The xenon lamp is also cooled by blower 36. The copper sulfate filter medium can be supplied through vents 38 and 39. If the glass filter containing copper ions is used instead of the copper solution, it can be placed under or above the water circulated through vents 38 and 39. A D.C. xenon arc is used, since the 60-cycle component from an A.C. xenon arc would show up in the solar cell output, preventing accurate measurements.

Tungsten lamps are most desirable for the infrared portion of the simulator spectrum because of their smooth continuous distribution of radiant energy in the desired wavelength bands. A color temperature of around 2800° K. has been found to be satisfactory. A higher color temperature would cause undesirably-short bulb lifetimes, while a lower color temperature would aggravate the problem of excessive heat absorption because of the extra energy in the infrared region.

The curve of radiation distribution of the sun in space approximates that of a 6000° K. black body radiator, while tungsten at 2800° K. deviates slightly from a 2800° K. black body radiator curve. The intensity of 2800° K. tungsten should be adjusted high enough to satisfy the required radiation at 0.8 micron for the sun's duplication. The amount of radiation from the tungsten becomes excessive at longer wavelengths.

Figure 3:
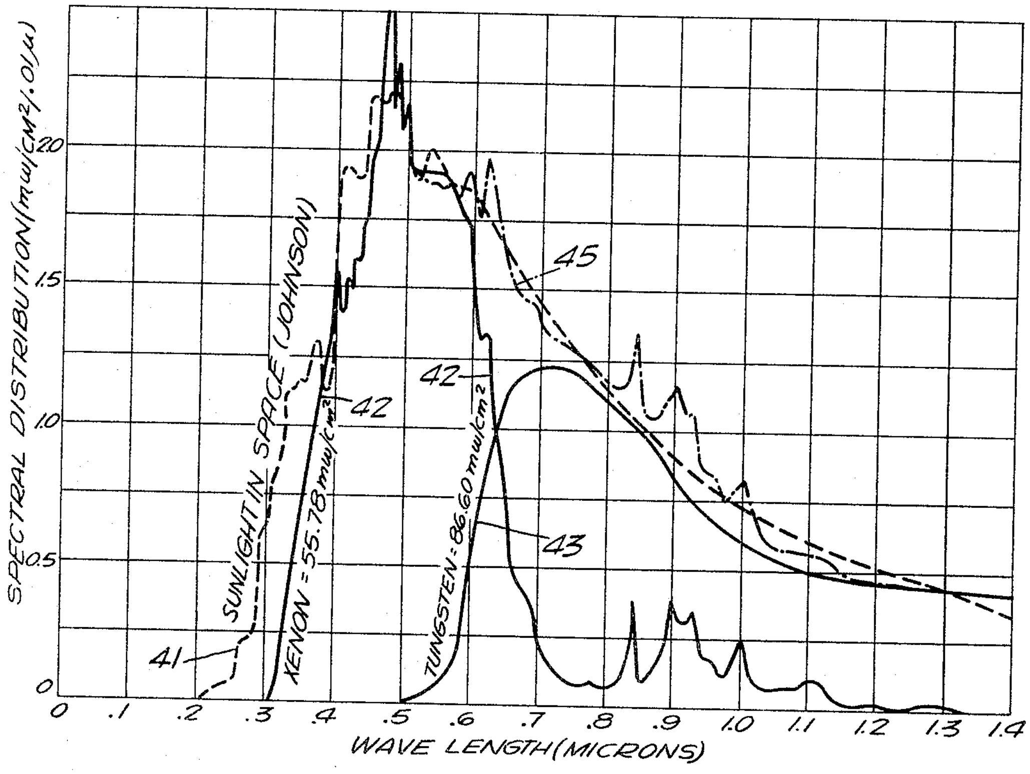
FIGURE 3 is a graph of the spectral distribution of the output of the simulator of FIGURE 2 compared to sunlight in space.

FIGURE 3 shows curves 41, 42, and 43, representing the spectral distributions of sunlight in space, of the xenon arc lamp, and of the tungsten lamp, respectively. Curve 45 represents the combined spectral distribution of the sunlight-in-space simulator of FIGURE 2. Curve 45 duplicates Johnson's curve of solar radiation in space within 5% integrated over the range from .3 to 1 micron.

Three different methods can be used to calibrate the simulator. The first method begins with the measurement of the relative spectral distribution of each of the two sources. The relative distribution amplitudes are varied until the best approximation to Johnson's curve is accomplished. After being drawn superimposed with Johnson's curve, an absolute energy scale is established. The areas under the corresponding simulator spectra are integrated with a planimeter to yield total energy readings for each source. The intensity level of each source is set to its required value as measured by an Eppley pyrheliometer.

The second method of calibration utilizes the spectral response of a silicon solar cell. The relative spectral response, as measured, is calibrated to give the absolute spectral response. Both the relative spectral response of a solar cell and the spectral distribution of tungsten radiation can be mathematically expressed as functions of wavelength. These functions are multiplied together for each increment of wavelength. The product is the function expressing cell output under tungsten illumination.

$$f(\lambda)xg(\lambda)=h(\lambda)$$

Where $f(\lambda)$=spectral response of cell
$g(\lambda)$=spectral distribution of tungsten illumination
$h(\lambda)$=spectral output of cell under tungsten illumination The area under the resulting curve is set equal to the cell's short circuit current for these conditions.

$$\int h(\lambda)d\lambda=I_{sc}$$

The absolute spectral response curve is multiplied point by point with Johnson's curve of solar space radiation distribution. This area is integrated to yield the short circuit current in space. This value agrees with the measured solar cell current in the simulator to within 1½%.

The third method involves the use of sunlight short circuit current measurements recorded over a period of years for several standard cells. These short circuit current measurements, taken at various sunlight intensities, are plotted on a curve which is projected to space. The extrapolated short circuit current for the standard cell in space is then compared to the $I_{sc}$ reading obtained with the simulator.

An analysis of the errors involved in these three methods and their effect upon the certainty of the results indicates that solar cell short circuit currents with this simulator are within 5% of short circuit currents under space sunlight according to Johnson's curve.

One important key to accuracy and consistency in these simulator tests is the pyrheliometer, a sensing tube which detects the total amount of energy in a light beam substantially regardless of color. The two light sources are directed to the pyrheliometer, one at a time, and then together, and adjusted until they combine to yield the same amount of energy as the sun in outer space. The pyrheliometer is prepared by exhaustive field tests, and a comparison with standards at the Smithsonian Institution. One of the most critical elements in the system is the calibration and repeatability of the pyrheliometer, since pyrheliometer error has a direct one-to-one correlation with simulator error. Once the simulator color has been verified by a spectrometer and its energy has been adjusted with the help of the pyrheliometer, the apparatus is ready for use.

Figure 4:
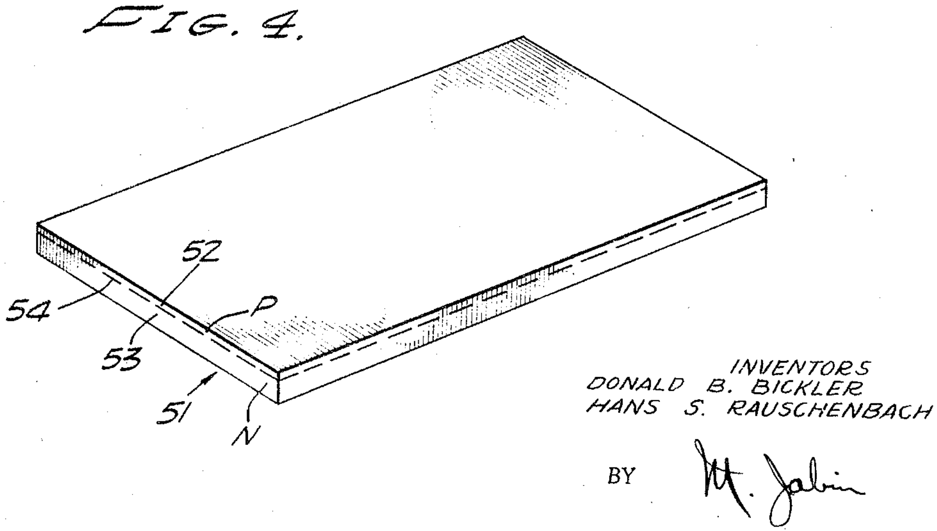
FIGURE 4 shows an improved solar cell made feasible by the simulator of FIGURE 2.

The described simulator has made feasible the development of solar cells that are more sensitive to the blue energy of space sunlight. The cells are improved by making the P-layer of P-on-N solar cells and the N-layer of N-on-P solar cells thinner than in the case of conventional solar cells. As a result, the active junction is moved closer to the surface, so that the shorter wavelengths of blue light can make a greater contribution to total energy conversion. Whereas the P-type region of conventional P-on-N solar cells, for example, is between .8 and 1.2 microns thick, the P-type region of "blue" space solar cells developed by the use of the described simulator is between .5 and .8 micron thick. FIGURE 4, by way of example, shows 1 x 2 cm. "blue" space P-on-N solar cell 51 having P-type region 52 and N-type region 53 separated by P-N junction 54. P-type region 52 is preferably about .6 micron thick.

In addition to the development of more efficient solar cells, some of the problems in solar cell measurement can be handled directly as a result of using the sunlight simulator. One of these is the matching of cells to be series shingled into modules which are assembled into series-parallel panels. All cells in a given series shingle must operate at the same current. All shingles wired in parallel must operate at the same voltage.

Experiments involving the effects of selectively reflective cover slides mounted on solar cells previously required individual calculations for the effects of absolute transmission and the change caused by mounting the slide on the cell. Some of these calculations become doubtful with random adhesive thicknesses. The simulator not only allows direct cell output readings, but also can be used with a vacuum chamber to very closely approximate the thermal equilibrium of space.

While particular embodiments of the present invention have been shown and described, it will be obvious to those skilled in the art that changes and modifications may be made without departing from this invention in its broader aspects, and therefore, the aim in the appended claim is to cover all such changes and modifications as fall within the true spirit and scope of this invention.

We claim:

Apparatus for simulating solar radiation in space, comprising (a) a xenon arc lamp;

(b) a first filtering means in front of said xenon arc lamp for absorbing the red end of the spectral distribution of the light radiated therefrom and transmitting the blue end, said filter limiting the radiation between .675 and .700 micron to a value of approximately 10% to 15% of the radiation between .500 and .525 micron;

(c) a tungsten lamp; and (d) second filtering means in front of said tungsten lamp for reducing the radiation of infrared light therefrom, said second filtering means comprising three colored-glass filters, the first of said filters having a light transmission at 1.1 microns of approximately 36% of its transmission at .75 micron, the second of said filters having a light transmission at .6 micron of approximately 63% of its transmission at 1.1 microns, the third of said filters having a light transmission at .53 micron of approximately 50% of its transmission at .7 micron and having a transmission at .56 micron of approximately 10% of its transmission at .7 micron;

(e) said lamps being so disposed that the lights passing through their respective filters can converge and in combination approximate the intensity and spectral distribution of sunlight in space.

References Cited

UNITED STATES PATENTS

| | | | |
|---|---|---|---|
| 883,944 | 4/1908 | Fish | 240—1.1 |
| 1,657,776 | 1/1928 | Wolf et al. | 88—107 X |
| 1,877,512 | 9/1932 | Hurley | 240—1.1 |
| 1,973,469 | 9/1934 | Denis | 250—226 X |
| 2,011,969 | 8/1935 | Cavanaugh | 240—1.1 |
| 2,012,236 | 8/1935 | Beck | 240—1.1 |
| 2,291,926 | 8/1942 | Sperti | 240—1.1 |
| 2,615,121 | 10/1952 | Cox | 240—1.1 X |
| 2,728,265 | 12/1955 | Stimson et al. | 250—226 X |
| 2,812,446 | 11/1957 | Pearson | 250—211 |
| 2,836,707 | 12/1958 | Stitt | 240—1.1 |
| 2,944,165 | 7/1960 | Stuetzer | 250—211 |
| 3,093,319 | 6/1963 | Gamain | 240—1.1 |
| 3,104,176 | 9/1963 | Hovey | 88—106 |

RALPH G. NILSON, *Primary Examiner.*

WALTER STOLWEIN, NORTON ANSHER, *Examiners.*

J. D. WALL, C. R. RHODES, *Assistant Examiners.*